(No Model.)
H. R. SILLMAN.
WOOD TURNING MACHINE.
No. 245,233. Patented Aug. 2, 1881.
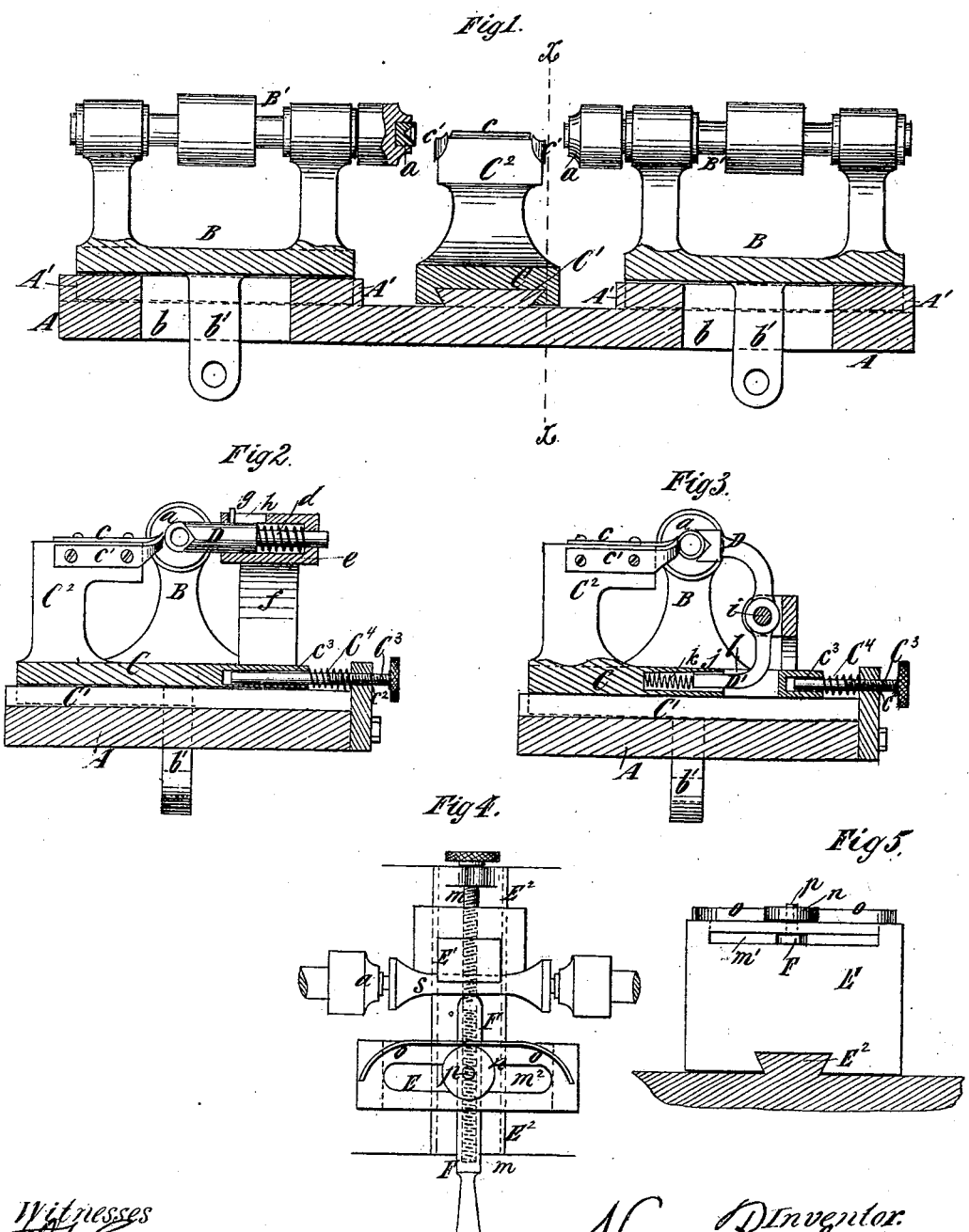

UNITED STATES PATENT OFFICE.

HENRY R. SILLMAN, OF BROOKLYN, NEW YORK, ASSIGNOR TO THE MERRICK THREAD COMPANY, OF HOLYOKE, MASSACHUSETTS.

WOOD-TURNING MACHINE.

SPECIFICATION forming part of Letters Patent No. 245,233, dated August 2, 1881.

Application filed May 23, 1881. (No model.)

*To all whom it may concern:*

Be it known that I, HENRY R. SILLMAN, of Brooklyn, in Kings county, and State of New York, have invented certain new and useful Improvements in Wood-Turning Machines, of which the following is a specification.

My invention is particularly applicable to machines for turning thread-bobbins for sewing-machines; but it may be embodied in machines for turning other articles with advantage.

My invention relates to machines for turning wood, in which the articles to be turned are grasped between two spindles which are adjustable toward and from each other, and which comprise a back-rest and a cutter stock or head, between which said articles are placed.

The invention consists in the combination, in such a machine, of a cutter-stock and a back-rest, between which the work is placed, and which may be moved simultaneously toward and from the work, a former or pattern carried by said stock, and a knife or cutter, also carried by stock, and adapted to be moved along said former or pattern.

It also consists in details of construction to be hereinafter described.

In the accompanying drawings, Figure 1 represents a vertical longitudinal section of a machine embodying my invention. Fig. 2 represents a transverse section upon the dotted line $x\ x$. Fig. 3 represents a similar transverse section of a machine of slightly modified form. Fig. 4 represents a plan of a portion of a machine of slightly modified form; and Fig. 5 represents a front view of the knife or cutter stocks shown in Fig. 4.

Similar letters of reference designate corresponding parts in all the figures.

A designates a bed or base plate having upon its upper surface dovetailed guides or ways A', upon which are movably fitted spindle-stocks B, in each of which is mounted a rotary spindle, B'.

On the ends of the spindles B' are chucks $a$, one of which is shown in section in Fig. 1, and which are made to conform to the ends of a sewing-machine shuttle-bobbin.

Projecting downward from the spindle-stocks B, through slots $b$ in the bed A, are lugs or arms $b'$, to which suitable devices (not here shown)—such, for example, as levers or rods—may be connected for moving the spindles and spindle-stocks nearer to or farther from each other, and causing them to gripe a bobbin between them.

The chucks $a$ may be made in any suitable way to enable them to hold tightly upon the bobbin and cause it to rotate with the spindles.

Referring, now, more particularly to Figs. 1, 2, and 3, C designates a carriage adapted to be moved transversely to the work, to and from the same over or along a dovetailed way or guide, C', upon the bed A, as best seen in Fig. 1. Upon this carriage is erected a cutter or knife stock, $C^2$, which carries three knives or cutters. One knife or cutter, $c$, is affixed to the top of the stock and operates on the periphery of a bobbin, and the other knives, $c'$, are affixed to the sides of the stock and operate on the ends of the bobbin.

$C^3$ designates a screw adapted to be adjusted in a bearing, $c^2$, so as to project more or less beyond the same, and here shown as entering a socket, $c^3$, in the carriage C. The said carriage may be moved inward toward the work until the bottom of the socket $c^3$ strikes the end of the screw, when its motion is arrested. Thus it will be seen that the screw $C^3$ forms an adjustable stop for limiting the movement of the carriage. $C^4$ designates a spring which fits between the carriage C and the bearing $c^2$, and thus forms a yielding resistance to the movement of the carriage C.

In connection with the cutter-stock $C^2$, I employ a back-rest, D, which in Fig. 2 is pressed up against the work on the opposite side to the cutters by a spring, $d$, to hold the work steady. As here shown, the rest consists of a bolt fitting in a socket, $e$, in a cross-bar or bridge, $f$, and its spring $d$ is arranged within said socket. From the bolt D there projects a pin, $g$, which works in a slot, $h$, in the socket $e$ and limits the movement of the bolt, and also prevents its turning, so that its notched end is always properly presented to the work.

In Fig. 3 the rest D is formed by one arm of a bent lever, which is fulcrumed at $i$, and the other end, D', of which engages with the transversely-movable carriage C by entering a socket, $j$, therein. Within the socket $j$ is a spring, $k$, and as the carriage C is moved toward the work it acts upon the lower arm, D′, of said lever D and moves the rest with a yielding force up against the work. The lower arm, D′, as here shown, works through a slot or opening, $l$, in the carriage C.

Referring, now, to Fig. 4, $a$ designates chucks in which the bobbin $s$ is held; and E E′ designate respectively a cutter-stock and a back-rest, which may be moved along a dovetailed guide or way, $E^2$, toward and from the bobbin, and also toward and from each other. The cutter-stock E and rest E′ are connected by a screw, $m$, having right and left hand threads, whereby the cutter-stock and rest are simultaneously moved.

F designates a tool or cutter, which fits loosely in a slot, $m'$, in the stock E, as seen in Fig. 5, and carries a pivot, $p$, which projects upward through a slot, $m^2$, as seen in Fig. 4. Upon the pivot $p$, above the stock, is mounted a wheel or roller, $n$, which, as said cutter is moved, runs along a former or pattern, $o$, and imparts the desired form to the bobbin $s$.

By my invention I provide a machine which may be used with advantage for turning sewing-machine bobbins and other wood articles of which duplicates are required.

If desirable, the tool F might be pivoted to the rest, so that by swinging its cutting-edge will describe an arc, and in such case the former $o$ would not be necessary.

What I claim as my invention, and desire to secure by Letters Patent, is—

1. In a wood-turning machine, a cutter-stock and a back-rest, between which the work is placed, and which are so combined that they may be moved simultaneously toward and from the work, a former or pattern carried by said stock, and a knife or cutter, also carried by said stock, and adapted to be moved along said former or pattern, substantially as specified.

2. The combination of the two rotary spindles B′, adapted to be adjusted toward each other, the movable cutter stock or head $C^2$, and the adjustable screw-stop $C^3$ and spring $C^4$, substantially as specified.

HENRY R. SILLMAN.

Witnesses:
T. J. KEANE,
CHANDLER HALL.